United States Patent [19]

Kohno

[11] Patent Number: 5,575,499
[45] Date of Patent: Nov. 19, 1996

[54] INFLATOR FOR AIR BAG DEVICE

[75] Inventor: Kaname Kohno, Tokyo, Japan

[73] Assignee: Takata Corporation, Tokyo, Japan

[21] Appl. No.: 350,032

[22] Filed: Nov. 29, 1994

[30] Foreign Application Priority Data

Mar. 23, 1994  [JP]  Japan ................................. 6-051684

[51] Int. Cl.⁶ ............................................. B60R 21/26
[52] U.S. Cl. .................. 280/741; 137/68.13; 137/68.27; 137/68.28; 102/531
[58] Field of Search ............................ 280/741, 736, 280/737, 740, 742; 137/68.13, 68.23, 68.27, 68.28; 222/541.3, 541.4, 3; 102/530, 531; 422/164, 165, 166

[56] References Cited

U.S. PATENT DOCUMENTS

| | | | |
|---|---|---|---|
| 3,087,428 | 4/1963 | Frech, Jr. ............................ | 102/531 |
| 3,708,181 | 1/1973 | Mazelsky ............................ | 280/740 |
| 3,778,084 | 12/1973 | Sutherland et al. ................. | 280/741 |
| 3,834,580 | 9/1974 | Ludwig et al. ..................... | 137/68.27 |
| 4,084,512 | 4/1978 | San Miguel ......................... | 102/531 |
| 4,734,265 | 3/1988 | Nilsson et al. ..................... | 280/741 |
| 4,817,828 | 4/1989 | Goetz .................................. | 280/736 |
| 4,886,293 | 12/1989 | Weiler et al. ....................... | 280/741 |
| 5,005,486 | 4/1991 | Lenzen ................................ | 102/531 |
| 5,060,973 | 10/1991 | Giovanetti .......................... | 280/741 |
| 5,439,250 | 8/1995 | Kokeguchi et al. ................. | 280/736 |

FOREIGN PATENT DOCUMENTS

0567113A1  10/1993  European Pat. Off. ............ 280/736

Primary Examiner—Anne Marie Boehler
Assistant Examiner—Peter C. English
Attorney, Agent, or Firm—Kanesaka & Takeuchi

[57] ABSTRACT

A casing has a casing body and an end plate and has propellant filled inside thereof. Gas discharge holes are provided to recess from an outer surface of the casing body and are sealed by a film. The film is molded integrally with the casing body.

10 Claims, 7 Drawing Sheets

5,575,499

INFLATOR FOR AIR BAG DEVICE

FIELD OF THE INVENTION AND RELATED ART STATEMENT

The present invention relates to an inflator for an air bag device of a vehicle, particularly to an inflator having an improved film for preventing propellant from absorbing moisture.

As shown in FIGS. 5 and 6, a conventional inflator for an air bag device for a passenger seat comprises a cylindrical casing 10, propellant 12 filled in the casing 10, and an igniter 14 for igniting the propellant 12. The casing 10 is normally made of aluminum or an aluminum alloy.

The casing 10 has gas discharge openings 16 for discharging gases. The gas discharge openings 16 are usually sealed with films 18, respectively. As gases are generated from the propellant 12, the films 18 are torn by gas pressure. A filter 20 is disposed around an inner surface of the casing 10. The filter 20 catches fine particles in the gases.

The casing 10 has a casing body 22 having a closed tip end, and an opened rear end 22a and an end plate 24 for sealing the rear end 22a of the casing body 22. Such a cylinder-type inflator may be used in an air bag device for a driver's seat or an air bag device for a rear seat.

As disclosed in U.S. Pat. No. 4,858,951, the end plate 24 is fixed to the casing body 22 by press-fitting the rear end 22a of the casing body 22.

FIG. 7 is a section view of an inflator mainly used in an air bag device for a driver's seat. This inflator has a casing 26, propellant 28 filled in the casing 26, and an igniter 30 for igniting the propellant 28.

The casing 26 has a front half portion 32 formed in a cup shape and a rear half portion 34 formed in a plate shape.

The front half portion 32 is provided with gas discharge openings 36 for discharging gases disposed in the side peripheral surface thereof. The openings 36 are sealed with films 38, respectively. The films 38 are torn by gas pressure as the propellant 28 reacts for generating gases.

A filter 40 is disposed around the inner peripheral surface of the front half portion 32. The rear half portion 34 is provided with a flange portion 42 extending in the lateral direction.

As described in U.S. Pat. No. 4,561,675, the front half portion 32 is welded to the rear half portion 34.

The inflator as shown in FIG. 7 may be used in an air bag device for a passenger seat or an air bag device for a rear seat.

When the conventional inflator is assembled, it is necessary to stick the films 18, 38 to the inner surfaces of the casings 10, 26, which requires time and labor. The casings 10, or 26 has a cylindrical contour or an annular contour having a small diameter and the inner surfaces of the casings 10, 26 curve with concaves. Therefore, it is troublesome to stick the films 18, 38 to air-tightly seal the openings 16, 36. As a result, the cost of assembling the inflator is increased.

The films 18, 38 are provided for preventing the propellant from absorbing atmospheric moisture, so that the films 18, 38 are needed to be stuck around the whole peripheries of the openings 16, 36.

OBJECT AND SUMMARY OF THE INVENTION

It is therefore an object of the present invention to provide an inflator wherein films for preventing propellant from absorbing moisture are made at a low cost.

An inflator according to the present invention has a metallic casing, a propellant filled in the casing, an igniter for starting a gas generating reaction of the propellant, and gas discharging means provided in the casing. The gas discharging means has a recessed portion recessed from at least one of an inner surface and an outer surface of the casing toward the other surface and a metallic film integrally formed with the casing and located at a bottom of the recess. The metallic film closes communication between the inside and the outside of the casing.

Preferably, the film is continuous with the inner surface of the casing.

The casing of the inflator according to the present invention is preferably made by metal (including alloy) having a low melting point such as magnesium, a magnesium alloy, aluminum or an aluminum alloy which has respectively light weight and good corrosion resistance.

The casing of the inflator according to the present invention is preferably molded by injection molding. A mold for molding is preferably provided with a plunger which is capable of projecting into a cavity of the mold. The plunger is projected into the cavity and a molten alloy is filled into the cavity. Then the plunger is returned to the original position so that a quite thin film is formed between a tip surface of the plunger and an inner surface of the mold facing the tip surface.

DETAILED DESCRIPTION OF THE PREFERRED EMBODIMENT

Figure 1:
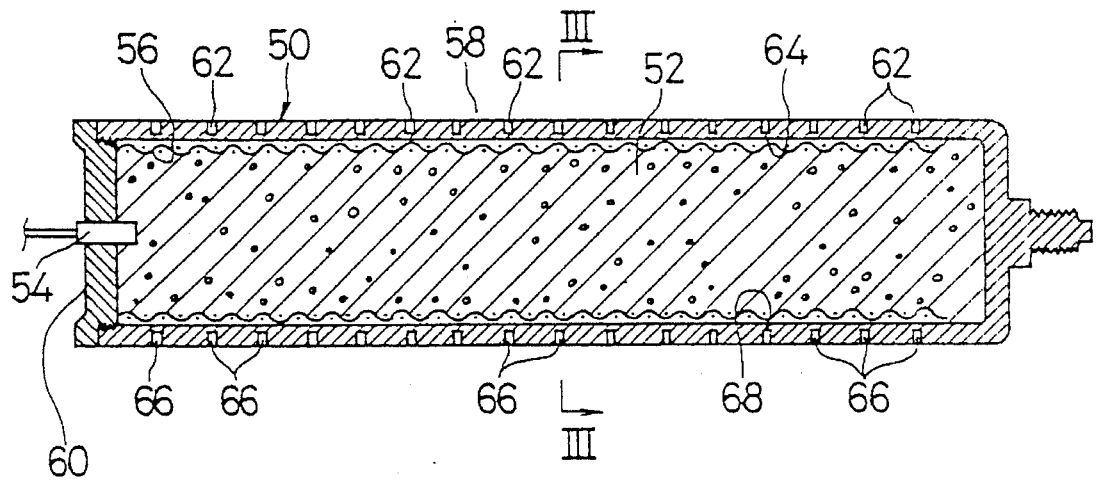
FIG. 1 is a longitudinal sectional view showing an inflator of an air bag device for a passenger seat according to an embodiment.
Figure 2:
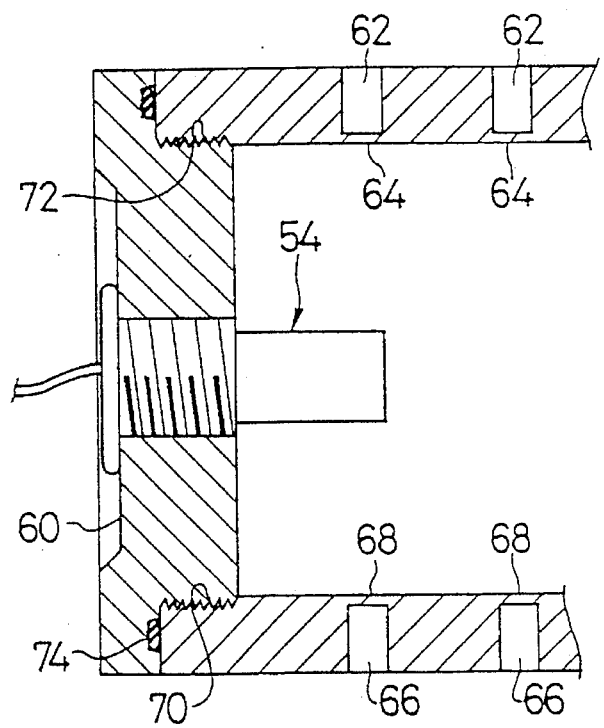
FIG. 2 is an enlarged sectional view showing a casing according to the embodiment of FIG. 1.
Figure 3:
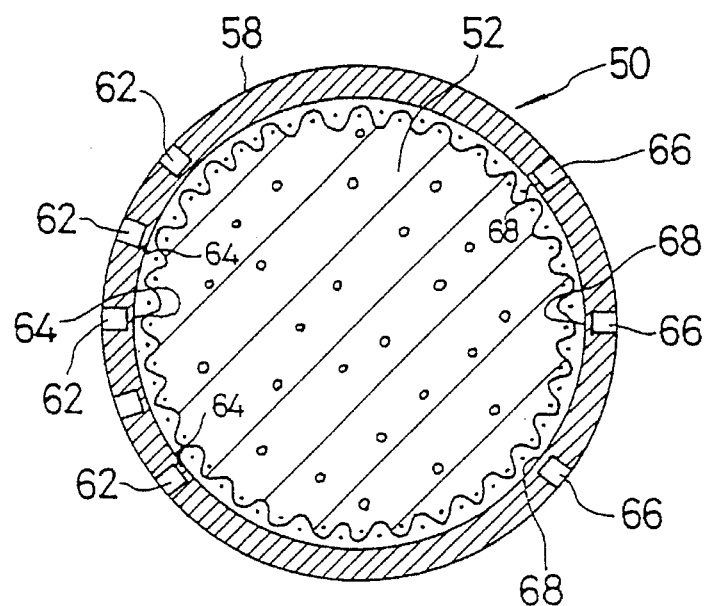
FIG. 3 is an enlarged cross-sectional view taken along line III—III of FIG. 1.
Figure 4:
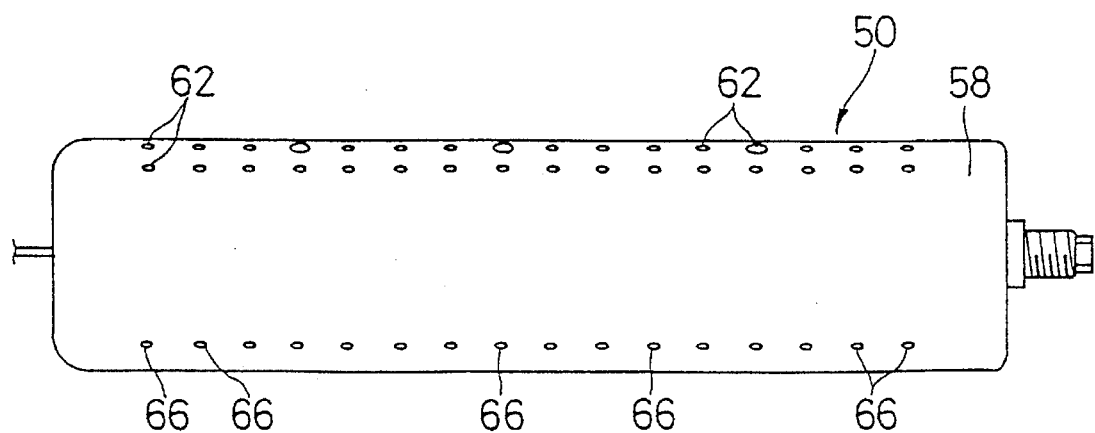
FIG. 4 is a side view of the inflator according to the embodiment of FIG. 1.
Figure 5:
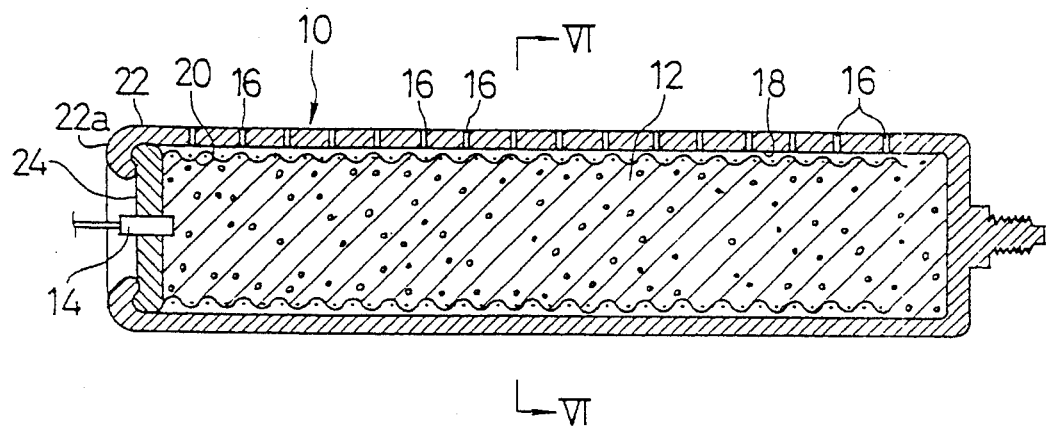
FIG. 5 is a longitudinal sectional view of a conventional inflator of an air bag device for a passenger seat.
Figure 6:
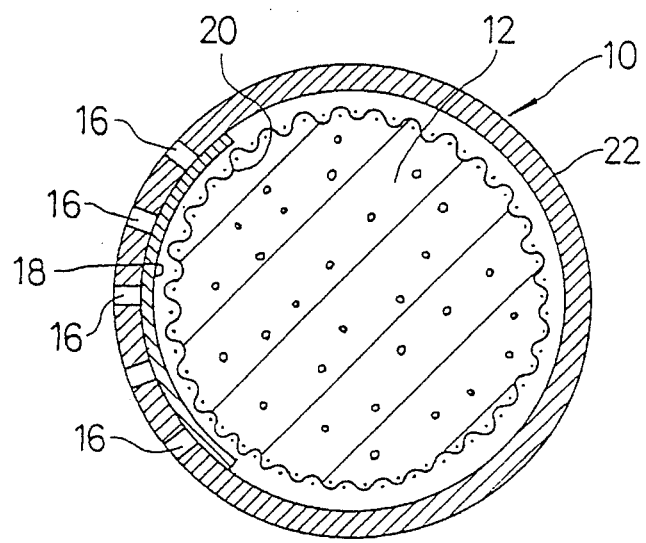
FIG. 6 is an enlarged cross-sectional view taken along line VI—VI of FIG. 5.
Figure 7:
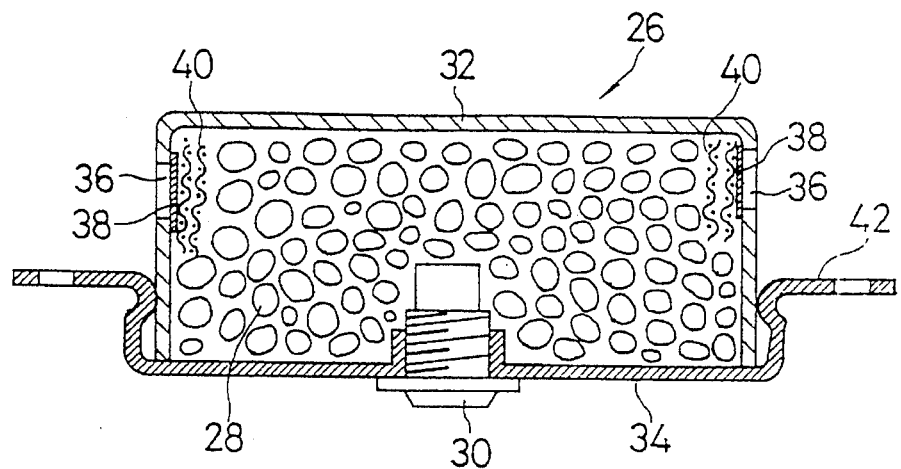
FIG. 7 is a sectional view of a conventional inflator used for an air bag device for a driver's seat.

Embodiments will now be described with reference to the attached drawings. FIG. 1 is a longitudinal sectional view showing an inflator of an air bag device according to an embodiment of the present invention, FIG. 2 is an enlarged cross-sectional view of a casing of the inflator, FIG. 3 is a cross-sectional view taken along line III—III of FIG. 1, and FIG. 4 is a side view of the inflator.

The inflator has a casing 50, propellant 52 filled in the casing 50, an igniter 54 for igniting the propellant 52, and a filter 56 disposed around an inner surface of the casing 50. The casing 50 has a casing body 58 having a closed tip end and opened rear end and an end plate 60 for sealing the rear end of the casing body 58. The igniter 54 is screwed into the end plate 60.

Gas discharge holes 62 for discharging gases when the propellant 52 is ignited by the igniter 54 are disposed on one side surfaces of the casing body 58 such that the gas discharge holes 62 are recessed from the outer surface of the casing body 58. The innermost ends of the gas discharge holes 62 are sealed by films 64, respectively, which are integrally formed with the casing body 58.

Gas discharge holes 66 for discharging gases when the inflator is involved in a fire and the propellant 52 is reacted to generate gases by heat are disposed on the other side surface of the casing body 58 and the gas discharge holes 66 are recessed from the outer surface of the casing body 58. The innermost ends of the gas discharge holes 66 are sealed by films 68, respectively, which are integrally formed with the casing body 58.

As shown in FIG. 2, an internal thread 70 is formed in the inner surface of the casing body 58 at the rear end side thereof. The internal thread 70 is formed by a thread cutting. The internal thread 70 also may be formed by molding using a mold which has an external thread.

An external thread 72 formed in the end plate 60 is screwed into the internal thread 70 so that the end plate 60 is fixed to the casing body 58. A gasket 74 is disposed between the outer periphery of the end plate 60 and the rear end surface of the casing body 58.

In this embodiment, the casing body 58 is made of magnesium, a magnesium alloy, aluminum or an aluminum alloy and is molded by an injection molding using a metallic mold. During this molding, the films 64 and 68 are integrally molded.

The thickness of each film 64 is about from 50 to 300 μm, preferably from 100 to 150 μm. Each of the films 68 preferably has a thickness slightly thicker (about 200–300 μm) than each of the films 64.

That is, in the inflator of the air bag device according to this embodiment, when the propellant 52 is normally ignited by the igniter 54, only the films 64 are torn to jet the gases only from the gas discharge holes 62. As the inflator is applied with heat during a fire, the propellant 52 is reacted to generate gases. At this stage, because the inflator is applied with heat during a fire, the propellant is reacted vigorously and the casing 50, metal members and peripheral members such as the filter 56 are heated. Therefore, since these members do not absorb heat, the internal pressure of the casing 50 increases so that both of the films 64 and 68 are torn. Thereby, the gases from the inflator are jetted out from both sides of the central axis of the inflator so that no thrust is developed in the inflator.

In the air bag device equipped with the inflator structured as mentioned above, as a vehicle mounted with this air bag device comes into collides, the igniter 54 is charged with an electricity to react the propellant 52 to generate a large volume of gas quickly. The generated gases tear only the films 64 and are jetted out through the gas discharge holes 62 so as to deploy the air bag rapidly.

When the inflator is involved in a fire during transportation or storage of the inflator and the propellant is then reacted, the generated gases tear the films 64 and 68 to jet out from both sides of the inflator through the gas discharge holes 62 and 66.

Figure 8:
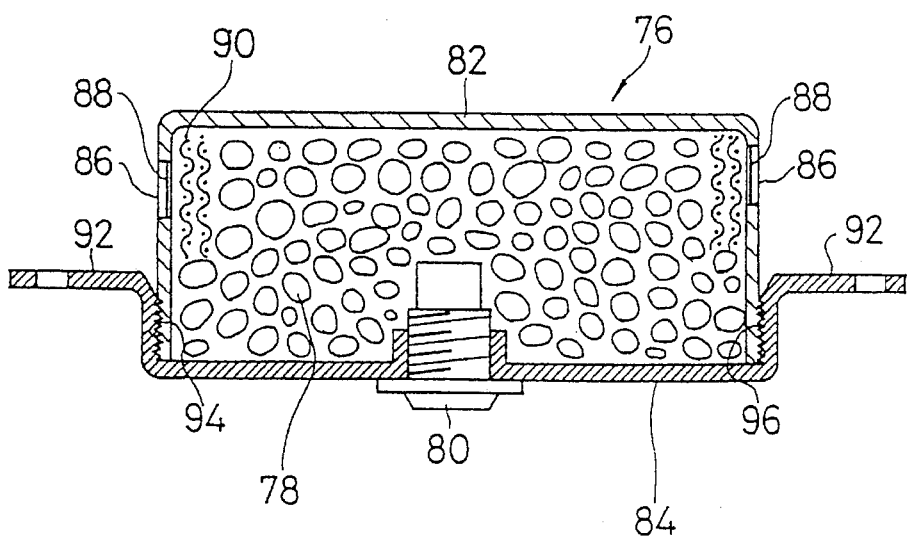
FIG. 8 is a sectional view of an inflator used for an air bag device for a driver's seat.
Figure 9:
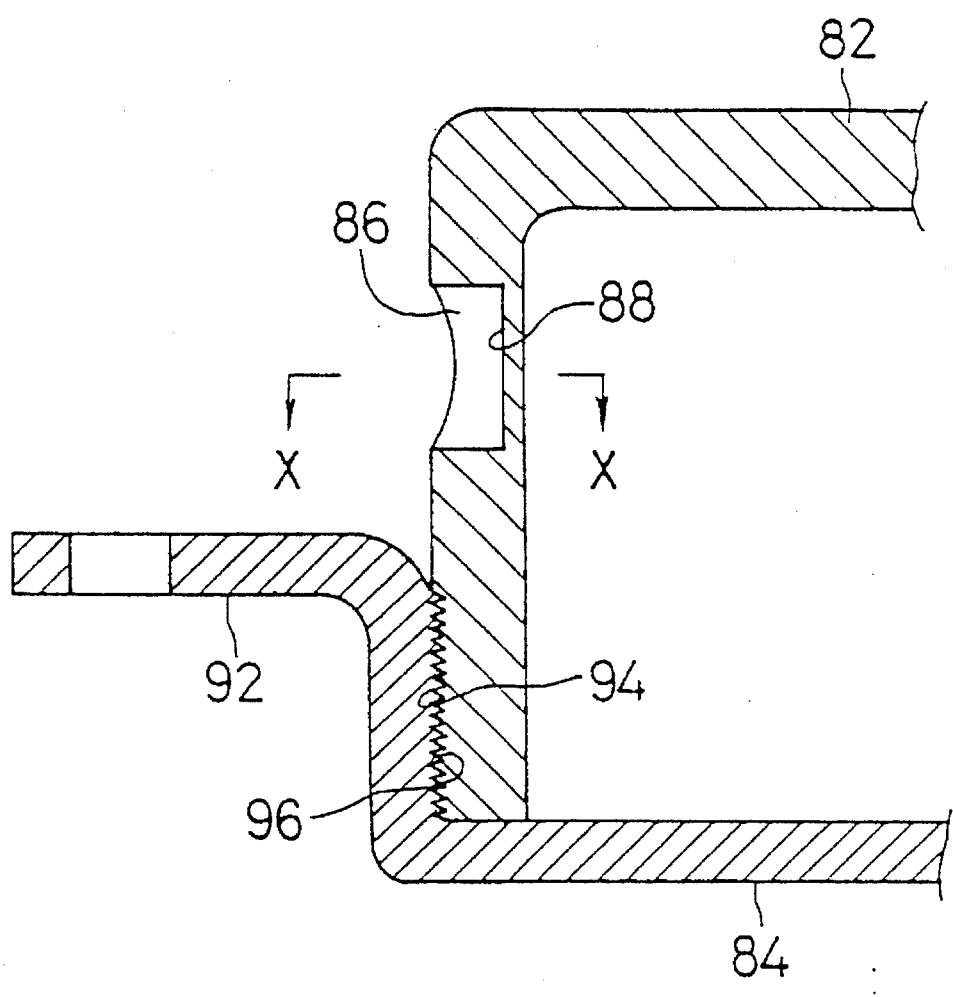
FIG. 9 is an enlarged sectional view showing a casing of the inflator shown in FIG. 8.
Figure 10:
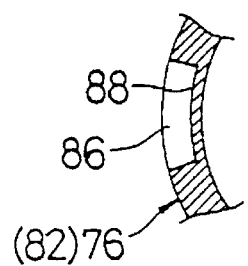
FIG. 10 is a sectional view taken along line X—X of FIG. 9.

FIG. 8 and FIG. 9 are sectional views of an embodiment of an inflator used for an air bag device for a driver's seat and FIG. 10 is a cross-sectional view taken along line X—X of FIG. 9.

The inflator comprises a casing 76, propellant 78 filled in the casing 76, and an igniter 80 for igniting the propellant 78.

The casing 76 comprises a front half portion 82 formed in a cup shape and a rear half portion 84 formed in a plate shape.

Gas discharge holes 86 are provided on a side peripheral surface of the front half portion 82. The gas discharge holes 86 are sealed by films 88 which are integrally formed with the casing 76 by molding. The films 88 are torn by gas pressure when the propellant 78 is reacted to generate gases.

A filter 90 is disposed around an inner peripheral surface of the front half portion 82. The reference numeral 92 designates a flange.

An outer peripheral surface of the front half portion 82 is provided with an external thread 94 at the rear end side thereof and an inner peripheral surface of the rear half portion 84 is provided with an internal thread 96 which is screwed with the external thread 94.

In the inflator structured as mentioned above, as the igniter 80 is charged with electricity, the propellant 78 is then reacted to generate gases so that the films 88 are torn by the gas pressure.

Figure 11:
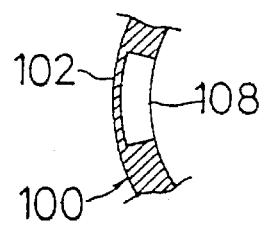
FIG. 11 is a cross-sectional view showing a main part of a casing of an inflator according to another embodiment.
Figure 12:
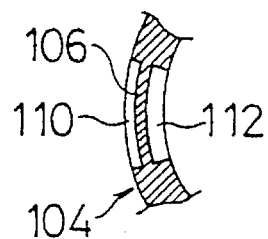
FIG. 12 is a cross-sectional view showing a casing of an inflator according to a further embodiment.

The films 64, 68 and 88 are continuous with the inner peripheral surface of the casing in the above mentioned embodiments. Instead of such films 64, 68, 88, a film 102 may be provided around an outer peripheral surface of a casing 100 as shown in FIG. 11, or a film 106 may be provided between an inner peripheral surface and an outer peripheral surface of the casing 104 as shown in FIG. 12. The reference numerals 108, 110, and 112 designate gas discharge holes.

The films are preferably formed at the innermost part of the casing as shown in FIG. 10, so as not to touch the film by hand during handling of the inflator. Such a casing having the film at the innermost part thereof is molded easily.

Figure 13:
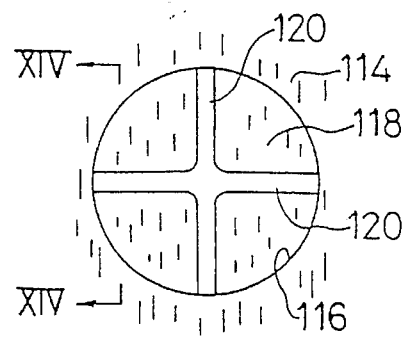
FIG. 13 is a front view showing a main part of a casing of an inflator according to an embodiment.
Figure 14:
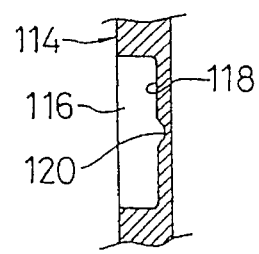
FIG. 14 is a cross-sectional view taken along line XIV—XIV of FIG. 13.

According to the present invention, the film may have a uniform thickness wholly or have a part with the thickness thinner than the other part. FIG. 13 is a front view showing a gas discharge hole with a thin part and FIG. 14 is a cross-sectional view taken along line XIV—XIV of FIG. 13.

The casing 114 is provided with the gas discharge holes 116. The gas discharge holes 116 are provided with films 118 integrally formed with the casing 114 at the innermost parts of the gas discharge holes 116. The film 118 is formed with a cross-shaped groove 120 so that when the propellant in the casing is reacted to generate gases and the film 118 is pushed by the gas pressure, the film 118 is torn along the groove 120.

Figure 15A:
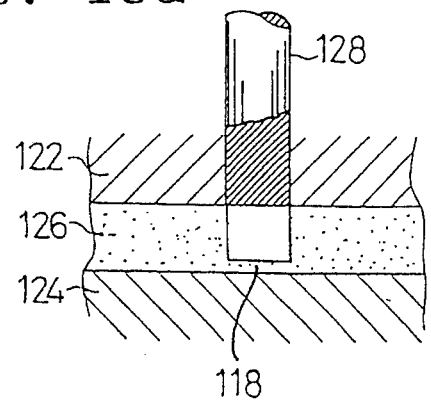
FIGS. 15a and 15b are sectional views of a mold showing a production process of the casing of the inflator according to the embodiment.
Figure 15B:
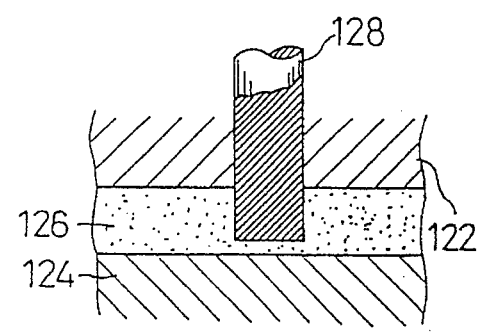

FIGS. 15a and 15b are cross-sectional views showing a preferred method of casting the casing of the inflator according to the present invention. A molten alloy or a semimolten alloy 126 is introduced into a cavity surrounded by a pair of metallic molds 122 and 124. The mold 122 is provided with a plunger 128 which is capable of projecting into the cavity. As shown in FIG. 15b, the plunger 128 is projected into the cavity at a predetermined stroke and the melted alloy 126 is introduced into the cavity and is solidified. After that, the plunger 128 is returned to a position shown in FIG. 15a. A quite thin film 118 is thereby formed in a desired thickness without any molding defect. The plunger 128 has a tip end formed in a convexity so that the groove 120 shown in FIGS. 13 and 14 can be easily formed.

As mentioned above, in the inflator of the air bag device according to the present invention, the film for sealing the gas discharge hole of the casing is structured by a metallic film integrally formed with the metallic casing so that the film can be molded with the casing together at the same time. Therefore, it is possible to make the production cost cheap and to reduce the production cost of the whole inflator.

The film of the casing of the inflator is not broken even by being pushed with a finger or the like, so that the casing is easily handled. The casing is molded easily.

What is claimed is:

1. An inflator of an air bag device adapted to inflate an air bag, comprising:

a metallic casing with a wall portion, a propellant filled in said casing for generating gas, an igniter situated inside the casing adjacent to the propellant, said igniter starting a gas generating reaction of the propellant when the igniter is actuated, and gas discharge means provided in the wall portion of the casing and integrally formed with the wall portion of the casing as one unit to completely seal the casing, said gas discharge means including first recessed portions with first metallic films to be able to communicate with the air bag, and second recessed portions with second metallic films situated at a side opposite to the first recessed portions, each of said first metallic films having a thickness less than a thickness of each of the second metallic films so that when the igniter is actuated upon collision of a vehicle, the first metallic films break to inflate the air bag, and when the propellant is ignited by heat due to a fire, the first and second metallic films break to prevent thrust from being formed by gases ejected from the first and second recessed portions.

2. An inflator according to claim 1, wherein said wall portion of the casing has inner and outer surfaces, and each of said first and second recessed portions has a cylindrical shape and extends from at least one of the inner and outer surfaces toward the other of the inner and outer surfaces.

3. An inflator according to claim 2, wherein said first and second recessed portions extend from the inner surface of the wall portion, said first and second metallic films being continuous with the outer surface of the casing.

4. An inflator according to claim 2, wherein each of said first and second recessed portions extends from the inner and outer surfaces of the wall portion so that each of the first and second metallic films is located at a portion between the inner and outer surfaces of the wall portion of the casing.

5. An inflator according to claim 1, wherein each of said first metallic films has a groove therein extending across a full length of each of the first metallic films so that the first metallic films are torn along the grooves when a pressure is applied to the first metallic films.

6. An inflator according to claim 5, wherein each of said grooves is a cross-shaped groove indented from a side of an outer surface of the wall portion.

7. An inflator of an air bag device adapted to inflate an air bag, comprising:

a metallic casing with a wall portion, said wall portion having inner and outer surfaces, a propellant filled in said casing for generating gas, an igniter situated inside the casing adjacent to the propellant, said igniter starting a gas generating reaction of the propellant when the igniter is actuated, and gas discharge means provided in the wall portion of the casing and integrally formed with the wall portion of the casing as one unit to completely seal the casing, said gas discharge means including cylindrical recessed portions with metallic films to be able to communicate with the air bag, each of said recessed portions extending from at least one of the inner and outer surfaces toward the other of the inner and outer surfaces, each metallic film having a groove therein extending across a full length of each metallic film and indented from a side of each recessed portion so that when the igniter is actuated upon collision of a vehicle, the metallic films are torn along the grooves to inflate the air bag.

8. An inflator according to claim 7, wherein each of said grooves is a cross-shaped groove.

9. An inflator according to claim 7, wherein said recessed portions extend from the inner surface of the wall portion, said metallic films being continuous with the outer surface of the casing.

10. An inflator according to claim 7, wherein each of said recessed portions extends from the inner and outer surfaces of the wall portion so that each of the metallic films is located at a portion between the inner and outer surfaces of the wall portion of the casing.

* * * * *